US006332215B1

(12) United States Patent
Patel et al.

(10) Patent No.: US 6,332,215 B1
(45) Date of Patent: Dec. 18, 2001

(54) JAVA VIRTUAL MACHINE HARDWARE FOR RISC AND CISC PROCESSORS

(75) Inventors: Mukesh K. Patel, Fremont; Jay Kamdar, Cupertino; V. R. Ranganath, Milpitas, all of CA (US)

(73) Assignee: Nazomi Communications, Inc., Santa Clara, CA (US)

( * ) Notice: Subject to any disclaimer, the term of this patent is extended or adjusted under 35 U.S.C. 154(b) by 0 days.

(21) Appl. No.: 09/208,741

(22) Filed: Dec. 8, 1998

(51) Int. Cl.[7] .................................................. G06F 9/45
(52) U.S. Cl. ................................................................ 717/5
(58) Field of Search ............................ 395/705; 717/5, 717/4, 9; 711/132

(56) References Cited

U.S. PATENT DOCUMENTS

| 4,587,612 | 5/1986 | Fisk et al. . |
| 4,631,663 | 12/1986 | Chilinski et al. . |
| 4,763,255 | 8/1988 | Hopkins et al. . |
| 4,783,738 | 11/1988 | Li et al. . |
| 4,860,191 | 8/1989 | Nomura et al. . |
| 4,961,141 | 10/1990 | Hopkins et al. . |
| 5,077,657 | 12/1991 | Cooper et al. . |
| 5,113,522 | 5/1992 | Dinwiddie, Jr. et al. ............ 709/400 |
| 5,136,696 | 8/1992 | Beckwith et al. . |
| 5,142,681 | 8/1992 | Driscoll et al. . |
| 5,163,139 | 11/1992 | Haigh et al. . |
| 5,193,180 | 3/1993 | Hastings . |
| 5,201,056 | 4/1993 | Daniel et al. . |
| 5,218,711 | 6/1993 | Yoshida .................................. 712/34 |
| 5,241,636 | 8/1993 | Kohn . |
| 5,313,614 | 5/1994 | Goettelmann et al. . |
| 5,333,296 | 7/1994 | Bouchard et al. . |
| 5,335,344 | 8/1994 | Hastings . |
| 5,355,460 | 10/1994 | Eickemeyer et al. . |
| 5,430,862 | 7/1995 | Smith et al. . |
| 5,481,684 | 1/1996 | Richter et al. . |
| 5,490,256 | 2/1996 | Mooney et al. . |
| 5,535,329 | 7/1996 | Hastings . |
| 5,542,059 | 7/1996 | Blomgren . |
| 5,574,927 | 11/1996 | Scantlin . |
| 5,577,233 | 11/1996 | Goettelmann et al. . |
| 5,619,666 | * 4/1997 | Coon et al. .......................... 712/208 |
| 5,634,118 | * 5/1997 | Blomgren ............................ 712/226 |
| 5,650,948 | 7/1997 | Gafter . |
| 5,659,703 | 8/1997 | Moore et al. ........................ 711/109 |
| 5,692,170 | 11/1997 | Isaman . |
| 5,761,477 | * 6/1998 | Wahbe et al. ............................ 709/1 |
| 5,764,908 | 6/1998 | Shoji et al. .......................... 709/217 |
| 5,768,593 | 6/1998 | Walters et al. . |

(List continued on next page.)

OTHER PUBLICATIONS

Debaere and Campenhout, "Interpretation and Instruction Path Coprocessing," ©1990 The MIT Press.
"Sun says JAVA chips will vastly increase speed, reduce costs to run JAVA programs," *Interactive Daily*, (Dec. 1996) downloaded from the Internet.
Andreas Krall, "Efficient JAVA VM Just–In–Time Compilation," IEEE 1998.
Title: Efficient Java VM Just–in–time Compilation, author: Krall et al, IEEE, 1998.*

(List continued on next page.)

*Primary Examiner*—Mark R. Powell
*Assistant Examiner*—Chameli C. Das
(74) *Attorney, Agent, or Firm*—Burns, Doane, Swecker & Mathis, LLP (57) ABSTRACT

A hardware Java accelerator is provided to implement portions of the Java virtual machine in hardware in order to accelerate the operation of the system on Java bytecodes. The Java hardware accelerator preferably includes Java bytecode translation into native CPU instructions. The combination of the Java hardware accelerator and a CPU provides a embedded solution which results in an inexpensive system to run Java programs for use in commercial appliances.

70 Claims, 9 Drawing Sheets

U.S. PATENT DOCUMENTS

| | | |
|---|---|---|
| 5,774,868 | 6/1998 | Cragun et al. . |
| 5,778,178 | 7/1998 | Arunachalam ........................ 709/203 |
| 5,781,750 | 7/1998 | Blomgren et al. . |
| 5,784,584 | 7/1998 | Moore et al. ......................... 712/200 |
| 5,794,068 | 8/1998 | Asghar et al. . |
| 5,809,336 | 9/1998 | Moore et al. ........................... 710/25 |
| 5,838,165 | 11/1998 | Chatter .................................... 326/38 |
| 5,875,336 * | 2/1999 | Dickol et al. ............................. 717/5 |
| 5,889,996 | 3/1999 | Adams ...................................... 717/5 |
| 5,898,850 * | 4/1999 | Dickol et al. ......................... 712/229 |
| 5,898,885 * | 4/1999 | Dickol et al. ......................... 711/118 |
| 5,903,761 * | 5/1999 | Tyma ........................................ 717/9 |
| 5,923,892 * | 7/1999 | Levy ....................................... 712/31 |
| 5,937,193 * | 8/1999 | Evoy ........................................ 717/5 |
| 5,953,741 * | 9/1999 | Evoy et al. ............................ 711/132 |
| 5,983,334 * | 11/1999 | Coon et al. ............................. 712/23 |
| 5,999,731 * | 12/1999 | Yellin et al. .............................. 717/4 |
| 6,021,469 * | 2/2000 | Tremblay et al. .................... 711/125 |
| 6,026,485 * | 2/2000 | O'Connor et al. .................... 712/226 |
| 6,131,144 * | 10/2000 | Koppala ................................ 711/132 |
| 6,158,048 * | 12/2000 | Lueh et al. ................................ 717/9 |
| 6,167,488 * | 12/2000 | Koppala ................................ 711/132 |
| 6,209,077 | 3/2001 | Robertson et al. . |

OTHER PUBLICATIONS

Title: SUN says Java chips will vastly increase speed, reduce costs to run Java programs, source: interactive daily, Dec. 6, 1996.*

Title: SGI WebForce 02 is a one–stop Web authoring platform, source: InfoWorld, Jan. 20, 1997.*

Title: CACAO a 64 bit Java VM just in time compiler, Concurrency: Practice and Experience, Noveber, 97.*

* cited by examiner

I. INSTRUCTION TRANSLATION

JAVA
BYTECODE                           NATIVE
                                                       INSTRUCTION iadd                                                   ADD R1, R2

II. JAVA REGISTER

PC = VALUE A                                           PC = VALUE A + 1
OPTOP = VALUE B                    OPTOP = VALUE B - 1
      (R1)                                                   (R2)
VAR = VALUE C                                          VAR = VALUE C

III. JAVA CPU REGISTER FILE

```
                          R0  0001                             NOT A VALID    R0  0001
CONTAINS VALUE  → R1  0150                              STACK VALUE → R1  0150
     OF TOP OF           R2  1210                       CONTAINS VALUE → R2  1360
OPERAND STACK            R3  0007                          OF THE TOP OF    R3  0007
                          R4  0005                         OPERAND STACK     R4  0005
                          R5  0006                                            R5  0006
CONTAINS FIRST → R6  1221                                                     R6  1221
    VARIABLE            R7  1361                                              R7  1361
```

IV. MEMORY

```
OPTOP = VALUE B →  - 0150                                            - 0150
    (VALUE B - 1) - 1210                           OPTOP = VALUE B - 1 - 1360
                  - 0007                                             - 0007
                  - 0005                                             - 0005
                  - 0006                                             - 0006
                  - 0001                                             - 0001
                  - 4427                                             - 4427
```

```
VAR = VALUE C - 1221                               VAR = VALUE C - 1221
              - 1361                                             - 1361
              - 1101                                             - 1101
```

FIG._5

I. INSTRUCTION TRANSLATION

| JAVA BYTECODE | | NATIVE INSTRUCTION |
|---|---|---|
| iload_n<br>iadd |  | ADD R6, R1 |

II. JAVA REGISTER

| | | |
|---|---|---|
| PC = VALUE A<br>OPTOP = VALUE B<br>(R1)<br>VAR = VALUE C |  | PC = VALUE A + 2<br>OPTOP = VALUE B<br>(R1)<br>VAR = VALUE C |

III. JAVA CPU REGISTER FILE

```
                        R0  0001                                R0  0001
        CONTAINS  →  R1  0150                CONTAINS  →  R1  1371
        VALUE OF     R2  1210                VALUE OF     R2  1210
        TOP OF       R3  0007    ⇨           TOP OF       R3  0007
     OPERAND STACK   R4  0005                  STACK      R4  0005
                     R5  0006                             R5  0006
      CONTAINS FIRST → R6 1221            CONTAINS    →  R6  1221
          VARIABLE    R7  1361              FIRST        R7  1361
                                          VARIABLE
```

IV. MEMORY

```
OPTOP = VALUE B →  - 0150                OPTOP = VALUE B  - 1371
                   - 1210                                 - 1210
                   - 0007       ⇨                         - 0007
                   - 0005                                 - 0005
                   - 0006                                 - 0006
                   - 0001                                 - 0001
                   - 4427                                 - 4427

VAR = VALUE C   - 1221                   VAR = VALUE C  - 1221
                   - 1361                                  - 1361
                   - 1101                                  - 1101
```

FIG._6

| Opcodes Mnemonic | Opcode xHH | Excep Gen |
|---|---|---|
| nop | 0x00 | |
| aconst_null | x01 | |
| iconst_m1 | x02 | |
| iconst_n(0-5) | x03 - x08 | |
| lconst_n(0-1) | x09 - x0a | |
| fconst_n(0-2) | x0c - x0d | |
| dconst_n(0-1) | x0e -x0f | |
| bipush | x10 | |
| sipush | x11 | |
| ldc | x12 | y |
| ldc_w | x13 | y |
| ldc2_w | x14 | y |
| iload | x15 | |
| lload | x16 | |
| fload | x17 | |
| dload | x18 | |
| aload | x19 | |
| iload_n(0-3) | x1a - x1d | |
| lload_n(0-3) | x1e - x21 | |
| fload_n(0-3) | x22 - x25 | |
| dload_n(0-3) | x26 - x29 | |
| aload_n(0-3) | x2a - x2d | |
| iaload | x2e | |
| laload | x2f | |
| faload | x30 | |
| daload | x31 | |
| aaload | x32 | |
| baload | x33 | |
| caload | x34 | |
| saload | x35 | |
| istore | x36 | |
| lstore | x37 | |
| fstore | x38 | |
| dstroe | x39 | |
| astroe | x3a | |
| istore_n(0-3) | x3b - x3e | |
| lstore_n(0-3) | x3f - x42 | |
| fstore_n(0-3) | x43 - x46 | |
| dstore_n(0-3) | x47 - x4a | |
| astore_n(0-3) | x4b - x4e | |
| iastore | x4f | |
| lastore | x50 | |
| fastroe | x51 | |
| dastore | x52 | |
| bastore | x53 | |
| aastore | x54 | |
| castroe | x55 | |
| sastore | x56 | |

FIG._7A

| | | |
|---|---|---|
| pop | x57 | |
| pop2 | x58 | |
| dup | x59 | |
| dup_x1 | x5a | |
| dup_x2 | x5b | |
| dup2 | x5c | |
| dup2_x1 | x5d | |
| dup2_x2 | x5e | |
| swap | x5f | |
| iadd | x60 | |
| ladd | x61 | |
| fadd | x62 | y |
| dadd | x63 | y |
| isub | x64 | |
| lsub | x65 | |
| fsub | x66 | y |
| dsub | x67 | y |
| imul | x68 | |
| lmul | x69 | |
| fmul | x6a | y |
| dmul | x6b | y |
| idiv | x6c | y |
| ldiv | x6d | y |
| fdiv | x6e | y |
| ddiv | x6f | y |
| irem | x70 | y |
| lrem | x71 | y |
| frem | x72 | y |
| drem | x73 | y |
| ineg | x74 | |
| lneg | x75 | |
| fneg | x76 | y |
| dneg | x77 | y |
| ishl | x78 | |
| lshl | x79 | |
| ishr | x7a | |
| lshr | x7b | |
| iushr | x7c | |
| lushr | x7d | |
| iand | x7e | |
| land | x7f | |
| ior | x80 | |
| lor | x81 | |
| ixor | x82 | |
| lxor | x83 | |
| iinc | x84 | |
| i2l | x85 | y |
| i2f | x86 | y |
| i2d | x87 | y |
| l2i | x88 | y |
| l2f | x89 | y |
| l2d | x8a | y |

*FIG._7B*

| | | |
|---|---|---|
| f2i | x8b | y |
| f2l | x8c | y |
| f2d | x8d | y |
| d2i | x8e | y |
| d2l | x8f | y |
| d2f | x90 | y |
| i2b | x91 | |
| i2c | x92 | |
| i2s | x93 | |
| lcmp | x94 | y |
| fcmpl | x95 | y |
| fcmpg | x96 | y |
| dcmpl | x97 | y |
| dcmpg | x98 | y |
| ifeq | x99 | |
| ifne | x9a | |
| iflt | x9b | |
| ifge | x9c | |
| ifgt | x9d | |
| ifle | x9e | |
| if_icmpeq | x9f | |
| if_icmpne | xa0 | |
| if_icmplt | xa1 | |
| if_acmpge | xa2 | |
| if_cmpgt | xa3 | |
| if_icmple | xa4 | |
| if_acmpeq | xa5 | |
| if_acmpne | xa6 | |
| goto | xa7 | |
| jsr | xa8 | |
| ret | xa9 | |
| tableswitch | xaa | y |
| lookupswitch | xab | y |
| ireturn | xac | |
| lreturn | xad | |
| freturn | xae | |
| dreturn | xaf | |
| areturn | xb0 | |
| return | xb1 | |
| getstatic | xb2 | y |
| putstatic | xb3 | y |
| getfield | xb4 | y |
| putfield | xb5 | y |
| invokevirtual | xb6 | y |
| invokespecial | xb7 | y |
| invokestatic | xb8 | y |
| invokeinterface | xb9 | y |
| xxunsedxxx | xba | y |
| new | xbb | y |
| newarray | xbc | y |
| anewarray | xbd | y |
| arraylength | xbe | y |

FIG._7C

| | | |
|---|---|---|
| athrow | xbf | y |
| checkcast | xc0 | y |
| instanceof | xc1 | y |
| monitorenter | xc2 | y |
| monitorexit | xc3 | y |
| wide | xc4 | y |
| multianewarray | xc5 | y |
| ifnull | xc6 | y |
| ifnonnull | xc7 | y |
| goto_w | xc8 | |
| jsr_w | xc9 | |
| | | |
| ldc_quick | xcb | y |
| ldc_w_quick | xcc | y |
| ldc2_w_quick | xcd | y |
| getfield_quick | xce | y |
| putfield_quick | xcf | y |
| getfield2_quick | xd0 | y |
| putfield2_quick | xd1 | y |
| getstatic_quick | xd2 | y |
| putstatic_quick | xd3 | y |
| gtestatic2_quick | xd4 | y |
| putstatic2_quick | xd5 | y |
| invokevirtual_quick | xd6 | y |
| invokenonvirtual_quick | xd7 | y |
| invokesuper_quick | xd8 | y |
| invokestatic_quick | xd9 | y |
| invokeinterface_quick | xda | y |
| invokevirtualobject_quick | xdb | y |
| new_quick | xdc | y |
| anewarray_quick | xde | y |
| multinewarray_quick | xdf | y |
| checkcast_quick | xe0 | y |
| instanceof_quick | xe1 | y |
| invokevirtual_quick_w | xe2 | y |
| getfield_quick_w | xe3 | y |
| putfield_quick_w | xe4 | y |
| | | |
| | | |
| breakpoint | xca | y |
| impdep1 | xfe | y |
| impdep2 | xff | y |

*FIG._7D*

JAVA VIRTUAL MACHINE HARDWARE FOR RISC AND CISC PROCESSORS

BACKGROUND OF THE INVENTION

Java™ is an object orientated programming language developed by Sun Microsystems. The Java language is small, simple and portable across platforms and operating systems, both at the source and at the binary level. This makes the Java programming language very popular on the Internet.

Java's platform independence and code compaction are the most significant advantages of Java over conventional programming languages. In conventional programming languages, the source code of a program is sent to a compiler which translates the program into machine code or processor instructions. The processor instructions are native to the system's processor. If the code is compiled on an Intel-based system, the resulting program will only run on other Intel-based systems. If it is desired to run the program on another system, the user must go back to the original source code, obtain a compiler for the new processor, and recompile the program into the machine code specific to that other processor.

Java operates differently. The Java compiler takes a Java program and, instead of generating machine code for a particular processor, generates bytecodes. Bytecodes are instructions that look like machine code, but aren't specific to any processor. To execute a Java program, a bytecode interpreter takes the Java bytecode converts them to equivalent native processor instructions and executes the Java program. The Java byte code interpreter is one component of the Java Virtual Machine.

Having the Java programs in bytecode form means that instead of being specific to any one system, the programs can run on any platform and any operating system as long a Java Virtual Machine is available. This allows a binary bytecode file to be executable across platforms.

The disadvantage of using bytecodes is execution speed. System specific programs that run directly on the hardware from which they are compiled, run significantly faster that Java bytecodes, which must be processed by the Java Virtual Machine. The processor must both convert the Java bytecodes into native instructions in the Java Virtual Machine and execute the native instructions.

One way to speed up the Java Virtual Machine is by techniques such as the "Just in Time" (JIT) interpreter, and even faster interpreters known as "Hot Spot JITs" interpreters. The JIT versions all result in a JIT compile overhead to generate native processor instructions. These JIT interpreters also result in additional memory overhead.

The slow execution speed of Java and overhead of JIT interpreters have made it difficult for consumer appliances requiring local-cost solutions with minimal memory usage and low energy consumption to run Java programs. The performance requirements for existing processors using the fastest JITs more than double to support running the Java Virtual Machine in software. The processor performance requirements could be met by employing superscalar processor architectures or by increasing the processor clock frequency. In both cases, the power requirements are dramatically increased. The memory bloat that results from JIT techniques, also goes against the consumer application requirements of low cost and low power.

It is desired to have an improved system for implementing Java programs that provides a low-cost solution for running Java programs for consumer appliances.

SUMMARY OF THE INVENTION

The present invention generally relates to a Java hardware accelerator which can be used to quickly translate Java bytecodes into native instructions for a central processing unit (CPU). The hardware accelerator speeds up the processing of the Java bytecodes significantly because it removes the bottleneck which previously occurred when the Java Virtual Machine is run in software on the CPU to translate Java bytecodes into native instructions.

In the present invention, at least part of the Java Virtual Machine is implemented in hardware as the Java hardware accelerator. The Java hardware accelerator and the CPU can be put together on a single semiconductor chip to provide an embedded system appropriate for use with commercial appliances. Such an embedded system solution is less expensive than a powerful superscalar CPU and has a relatively low power consumption.

The hardware Java accelerator can convert the stack-based Java bytecodes into a register-based native instructions on a CPU. The hardware accelerators of the present invention are not limited for use with Java language and can be used with any stack-based language that is to be converted to register-based native instructions. Also, the present invention can be used with any language that uses instructions, such as bytecodes, which run on a virtual machine.

BRIEF DESCRIPTION OF THE DRAWINGS

The present invention may be further understood from the following description in conjunction with the drawings.

DETAILED DESCRIPTION OF THE PREFERRED EMBODIMENTS

Figure 1:
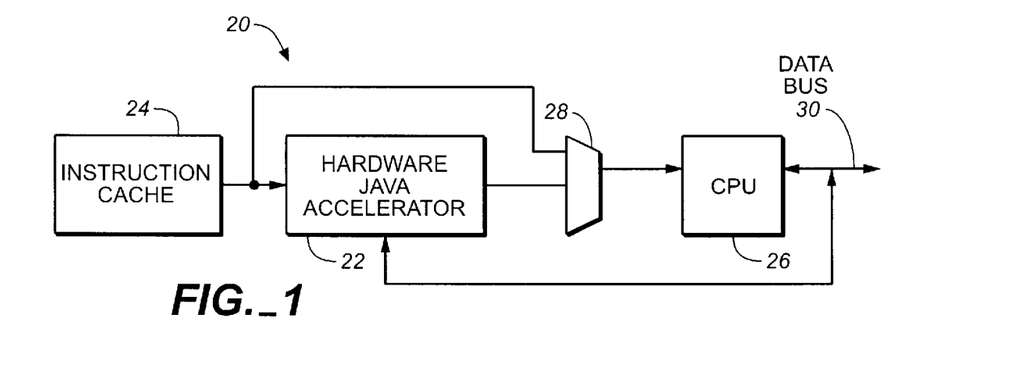
FIG. 1 is a diagram of the system of the present invention including the hardware Java accelerator.

FIG. 1 is a diagram of the system 20 showing the use of a hardware Java accelerator 22 in conjunction with a central processing unit 26. The Java hardware accelerator 22 allows part of the Java Virtual Machine to be implemented in hardware. This hardware implementation speeds up the processing of the Java byte codes. In particular, in a preferred embodiment, the translation of the Java bytecodes into native processor instructions is at least partially done in the hardware Java accelerator 22. This translation has been part of a bottleneck in the Java Virtual Machine when implemented in software. In FIG. 1, instructions from the instruction cache 24 or other memory is supplied to the hardware Java accelerator 22. If these instruction are Java bytecode, the hardware Java accelerator 22 can convert these bytecodes into native processor instruction which are supplied through the multiplexer 28 to the CPU. If a non-Java code is used, the hardware accelerator can be by-passed using the multiplexer 26.

The Java hardware accelerator can do, some or all of the following tasks:

1. Java bytecode decode;
2. identifying and encoding instruction level parallelism (ILP), wherever possible;
3. translating bytecodes to native instructions;
4. managing the Java stack on a register file associated with the CPU or as a separate stack;
5. generating exceptions on instructions on predetermined Java byte codes;
6. switching to native CPU operation when native CPU code is provided;
7. performing bounds checking on array instructions; and
8. managing the variables on the register file associated with the CPU.

In a preferred embodiment, the Java Virtual Machine functions of bytecode interpreter, Java register, and Java stack are implemented in the hardware Java accelerator. The garbage collection heap and constant pool area can be maintained in normal memory and accessed through normal memory referencing.

The major advantages of the Java hardware accelerator is to increase the speed in which the Java Virtual Machine operates, and allow existing native language legacy applications, software base, and development tools to be used. A dedicated microprocessor in which the Java bytecodes were the native instructions would not have accesss to those legacy applications.

Although the Java hardware accelerator is shown in FIG. 1 as separate from the central processing unit, the Java hardware accelerator can be incorporated into a central processing unit. In that case, the central processing unit has a Java hardware accelerator subunit to translate Java bytecode into the native instructions operated on by the main portion of the CPU.

Figure 2:
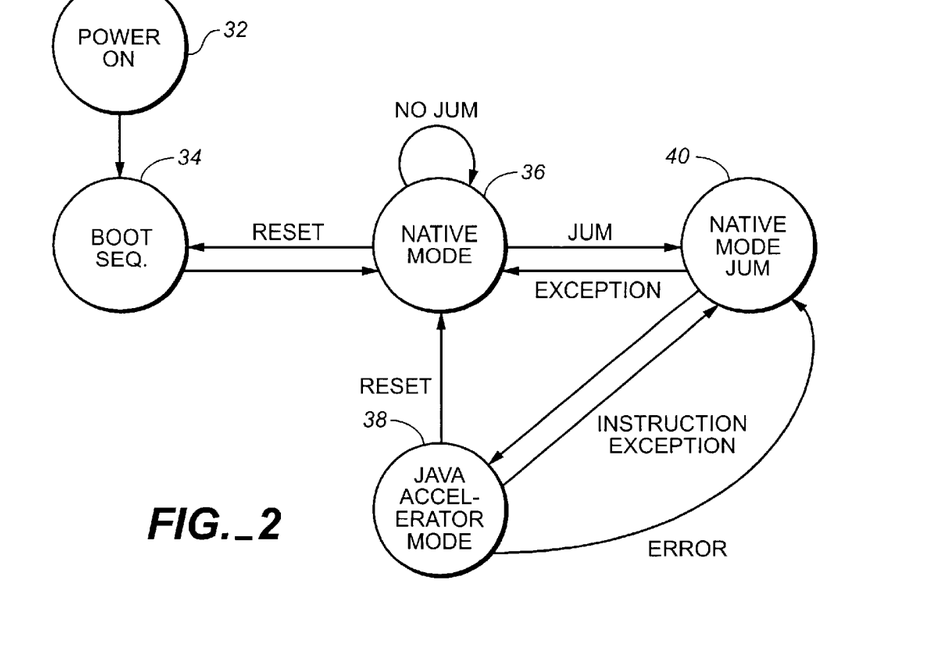
FIG. 2 is a diagram illustrating the use of the hardware Java accelerator of the present invention.

FIG. 2 is a state machine diagram that shows the operation of one embodiment of the present invention. Block 32 is the power-on state. During power-on, the multiplexer 28 is set to bypass the Java hardware accelerator. In block 34, the native instruction boot-up sequence is run. Block 36 shows the system in the native mode executing native instructions and by-passing the Java hardware accelerator.

In block 38, the system switches to the Java hardware accelerator mode. In the Java hardware accelerator mode, Java bytecode is transferred to the Java hardware accelerator 22, converted into native instructions then sent to the CPU for operation.

The Java accelerator mode can produce exceptions at certain Java bytecodes. These bytecodes are not processed by the hardware accelerator 22 but are processed in the CPU 26. As shown in block 40, the system operates in the native mode but the Java Virtual Machine is implemented in the CPU which does the bytecode translation and handles the exception created in the Java accelerator mode.

The longer and more complicated bytecodes that are difficult to handle in hardware can be selected to produce the exceptions. FIG. 7 is a table showing one possible list of bytecodes which can cause exceptions in a preferred embodiment.

Figure 3:
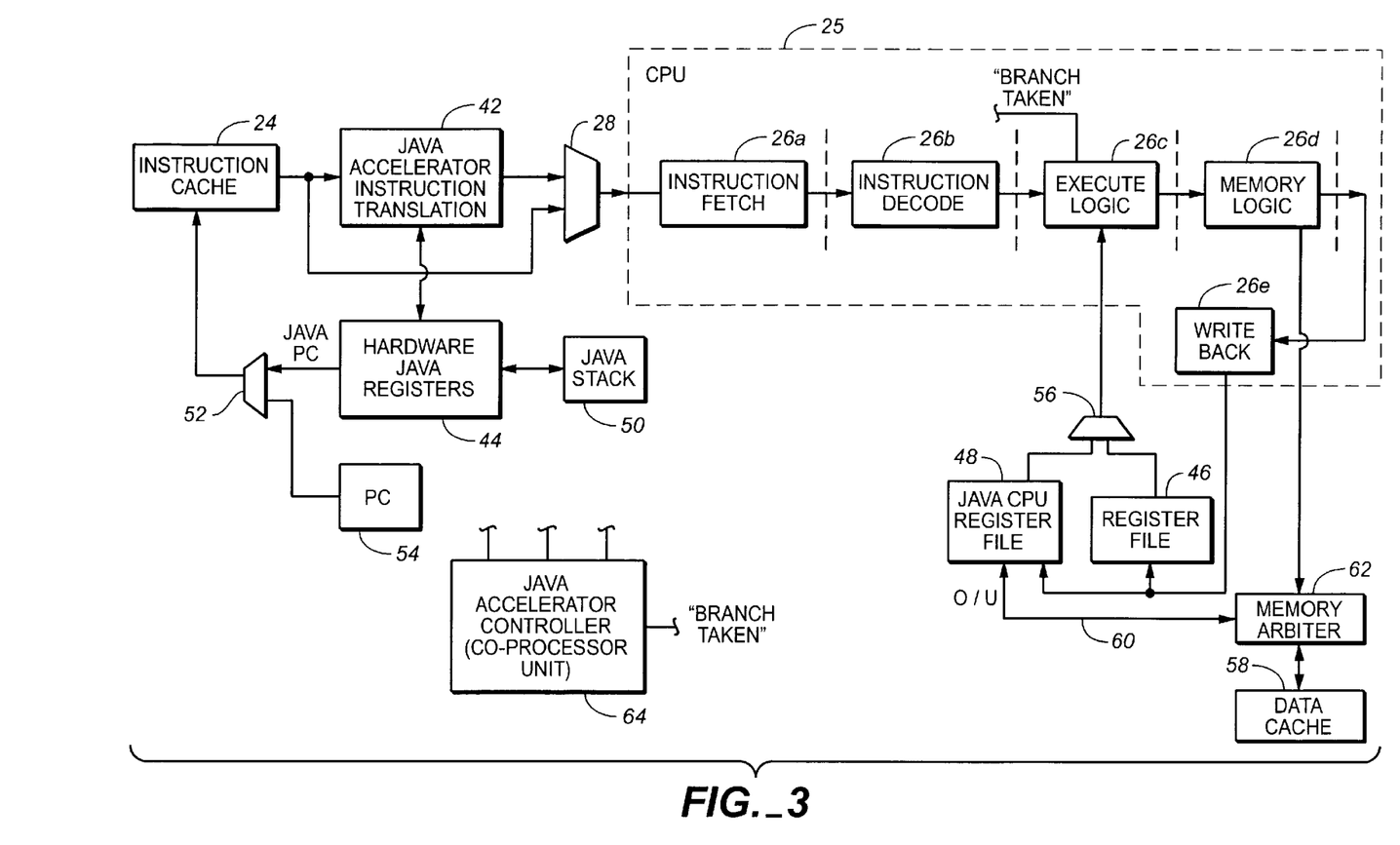
FIG. 3 is a diagram illustrating some the details of a Java hardware accelerator of one embodiment of the present invention.

FIG. 3 is a diagram illustrating details of one embodiment of the Java hardware accelerator of the present invention.

The Java hardware accelerator includes Java accelerator instruction translation hardware 42. The instruction translation Unit 42 is used to convert Java bytecodes to native instructions. One embodiment of the Java accelerator instruction translation hardware 42 is described in more detail below with respect to FIG. 4. This instruction translation hardware 42 uses data stored in hardware Java registers 44. The hardware Java Registers store the Java Registers defined in the Java Virtual Machine. The Java Registers contain the state of the Java Virtual Machine, affect its operation, and are updated after each bytecode is executed. The Java registers in the Java virtual machine include the PC, the program counter indicating what bytecode is being executed; Optop, a pointer to the top of the operand stack; Frame, a pointer to the execution environment of the current method; and Vars, a pointer to the first local variable available of the currently executing method. The virtual machine defines these registers to be a single 32-bit word wide. The Java registers are also stored in the Java stack which can be implemented as the hardware Java stack 50 or the Java stack can be stored into the CPU associated register file.

In a preferred embodiment, the hardware Java registers 44 can include additional registers for the use of the instruction translation hardware 42. These registers can include a register indicating a switch to native instructions and a register indicating the version number of the system.

The Java PC can be used to obtain bytecode instructions from the instruction cache 24. In one embodiment the Java PC is multiplexed with the normal program counter 54 of the central processing unit 26 in multiplexer 52. The normal PC 54 is not used during the operation of the Java hardware bytecode translation. In another embodiment, the normal program counter 54 is used as the Java program counter.

The Java registers are a part of the Java Virtual Machine and should not be confused with the general registers 46 or 48 which are operated upon by the central processing unit 26. In one embodiment, the system uses the traditional CPU register file 46 as well as a Java CPU register file 48. When native code is being operated upon the multiplexer 56 connects the conventional register file 46 to the execution logic 26c of the CPU 26. When the Java hardware accelerator is active, the Java CPU register file 48 substitutes for the conventional CPU register file 46. In another embodiment, the conventional CPU register file 46 is used.

As described below with respect to FIGS. 3 and 4, the Java CPU register file 48, or in an alternate embodiment the conventional CPU register file 46, can be used to store portions of the operand stack and some of the variables. In this way, the native register-based instructions from the Java accelerator instruction translator 42 can operate upon the operand stack and variable values stored in the Java CPU register file 48, or the values stored in the conventional CPU register file 46. Data can be written in and out of the Java CPU register file 48 from the data cache or other memory 58 through the overflow/underflow line 60 connected to the memory arbiter 62. The overflow/underflow transfer of data to and from the memory to can done concurrently with the CPU operation. Alternately, the overflow/underflow transfer can be done explicitly while the CPU is not operating. The overflow/underflow bus 60 can be implemented as a tri-state bus or as two separate buses to read data in and write data out of the register file when the Java stack overflows or underflows.

The register files for the CPU could alternately be implemented as a single register file with native instructions used to manipulate the loading of operand stack and variable values to and from memory. Alternately, multiple Java CPU register files could be used: one register file for variable values, another register file for the operand stack values, and another register file for the Java frame stack holding the method environment information.

The Java accelerator controller (co-processing unit) 64 can be used to control the hardware Java accelerator, read in and out from the hardware Java registers 44 and Java stack 50, and flush the Java accelerator instruction translation pipeline upon a "branch taken" signal from the CPU execute logic 26c.

The CPU 26 is divided into pipeline stages including the instruction fetch 26a, instruction decode 26b, execute logic 26c, memory access logic 26d, and writeback logic 26e. The execute logic 26c executes the native instructions and thus can determine whether a branch instruction is taken and issue the "branch taken" signal.

Figure 4:
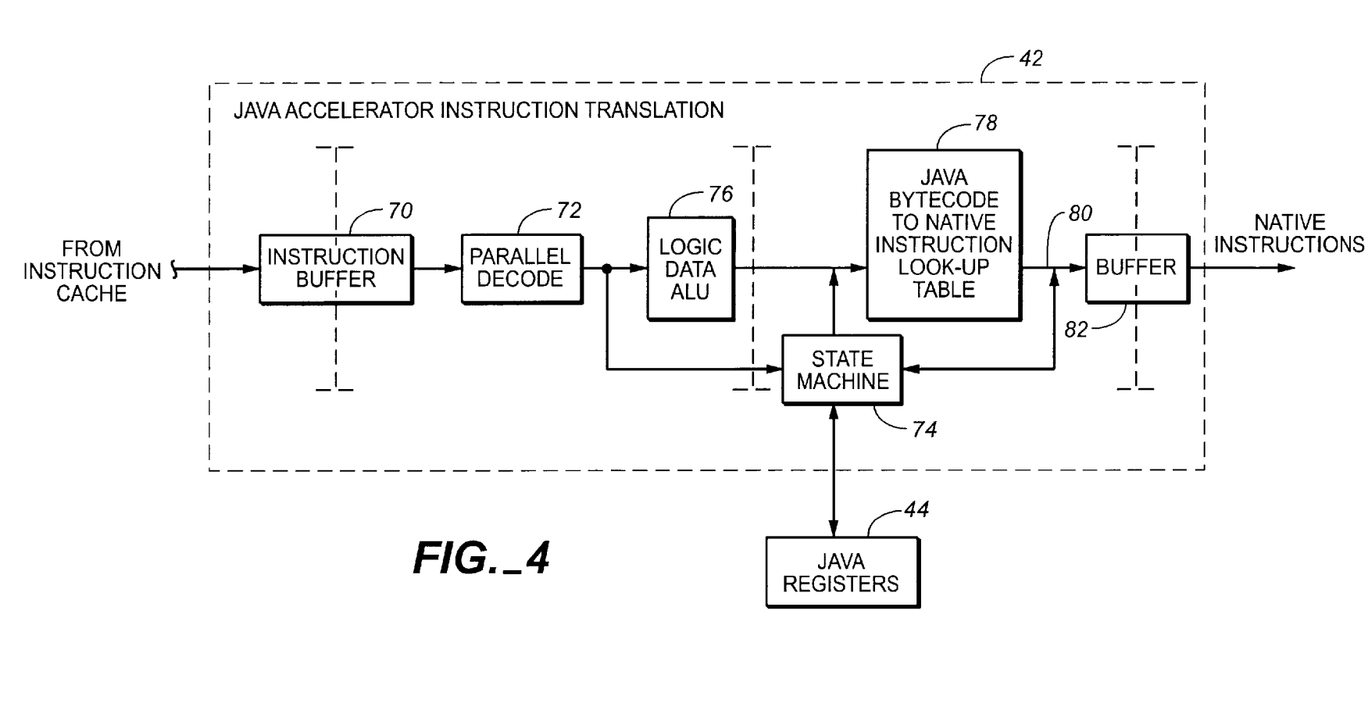
FIG. 4 is a diagram illustrating the details of one embodiment of a Java accelerator instruction translation in the system of the present invention.

FIG. 4 illustrates an embodiment of a Java accelerator instruction translator which can be used with the present invention. The instruction buffer 70 stores the bytecode instructions from the instruction cache. The bytecodes are sent to a parallel decode unit 72 which decodes multiple bytecodes at the same time. Multiple bytecodes are processed concurrently in order to allow for instruction level parallelism. That is, multiple bytecodes may be converted into a lesser number of native instructions.

The decoded bytecodes are sent to a state machine unit 74 and Arithmetic Logic Unit (ALU) 76. The ALU 76 is provided to rearrange the bytecode instructions to make them easier to be operated on by the state machine 74. The state machine 74 converts the bytecodes into native instructions using the look-up table 78. Thus, the state machine 74 provides an address which indicates the location of the desired native instruction in the look-up table 78 . Counters are maintained to keep a count of how many entries have been placed on the operand stack, as well as to keep track of the top of the operand stack. In a preferred embodiment, the output of the look-up table 78 is augmented with indications of the registers to be operated on at line 80. The register indications are from the counters and interpreted from bytecodes. Alternately, these register indications can be sent directly to the Java CPU register file 48 shown in FIG. 3.

The state machine 74 has access to the Java registers in 44 as well as an indication of the arrangement of the stack and variables in the Java CPU register file 48 or in the conventional CPU register file 46. The buffer 82 supplies the translated native instructions to the CPU.

Figure 5:
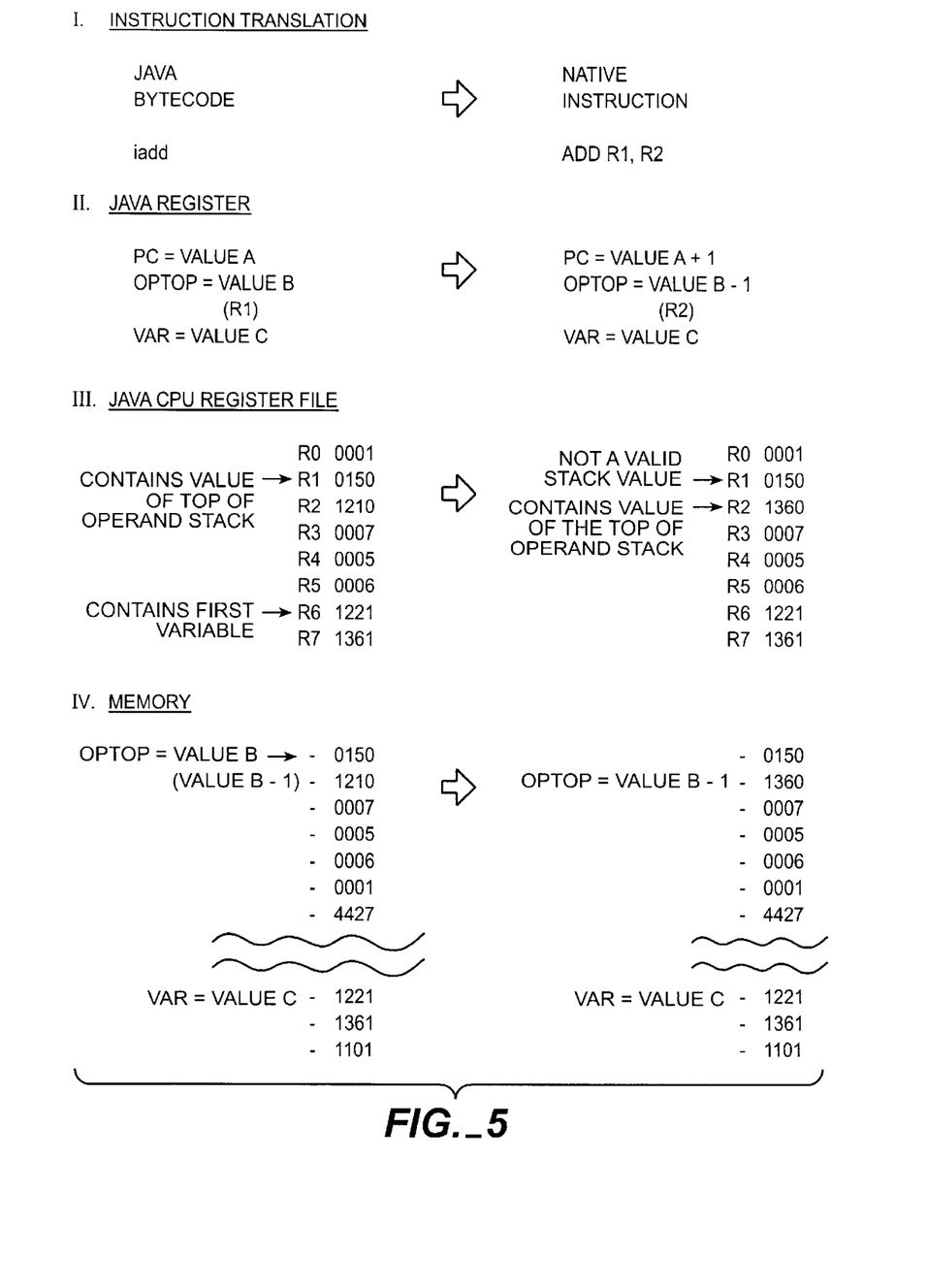
FIG. 5 is a diagram illustration the instruction translation operation of one embodiment of the present invention.
Figure 6:
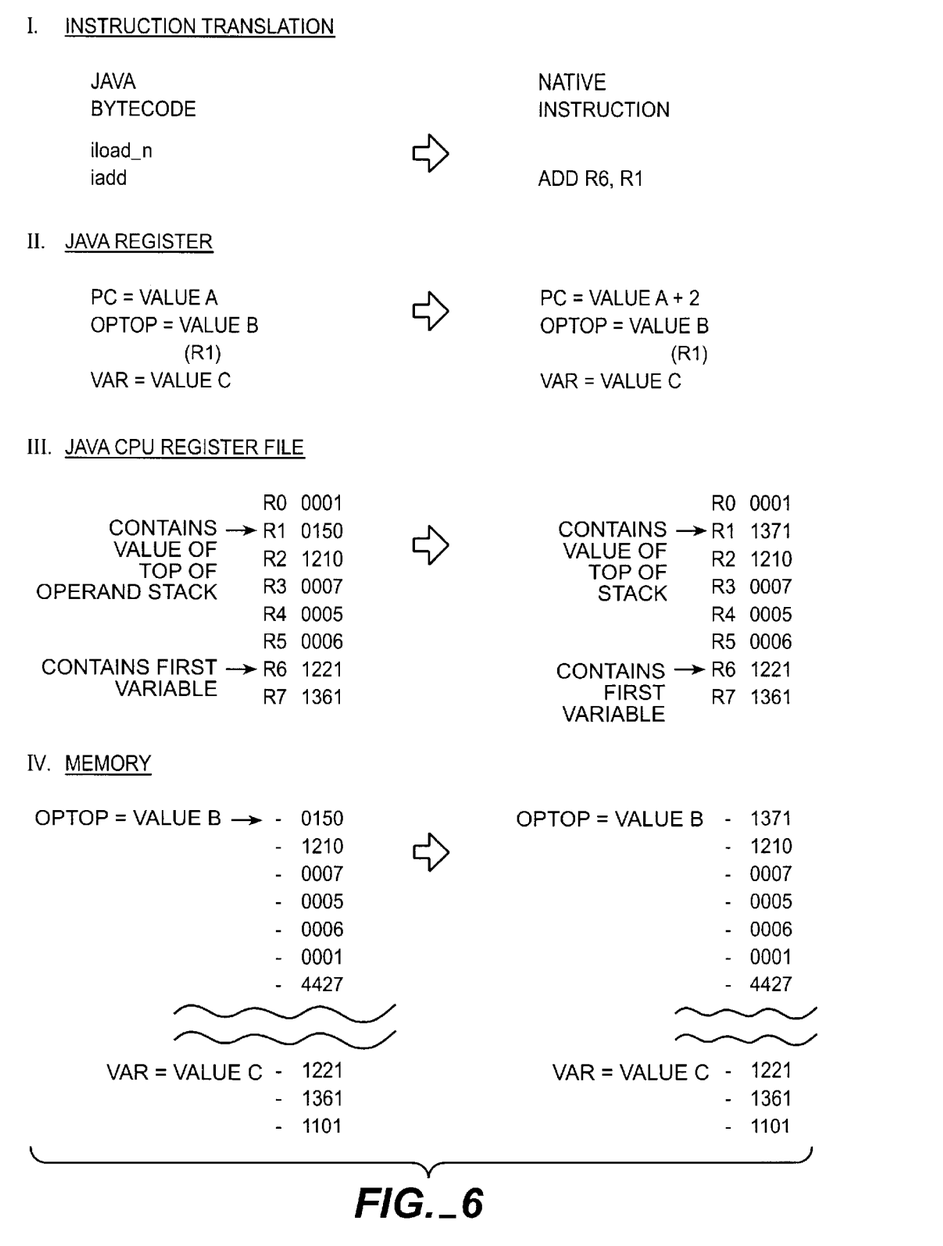
FIG. 6 is a diagram illustrating the instruction translation system of one embodiment of the present invention using instruction level parallelism.
Figure 7A:
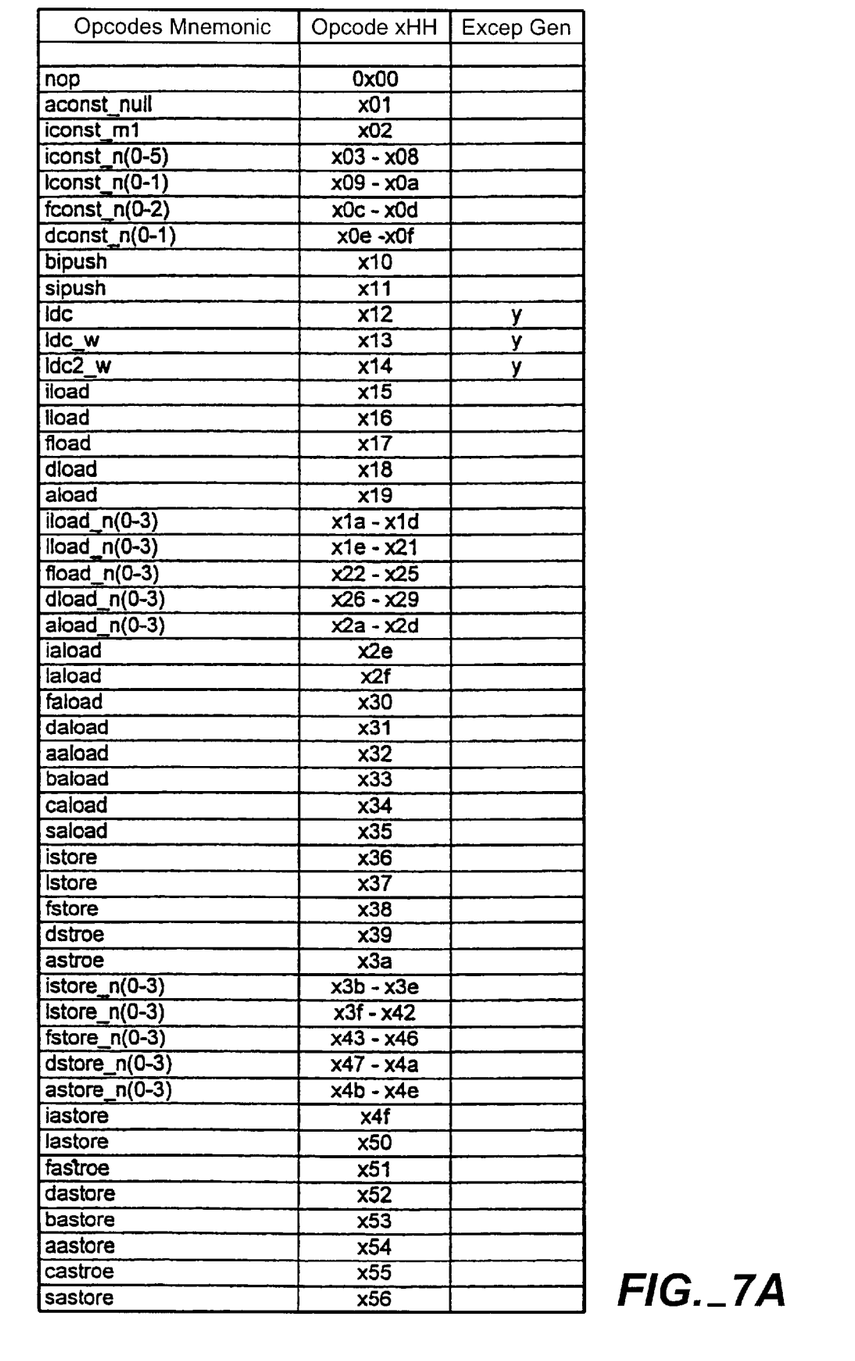
FIGS. 7A–7D is the diagram of the table showing the possible list of byte codes which can cause exception in the preferred embodiment.
Figure 7B:
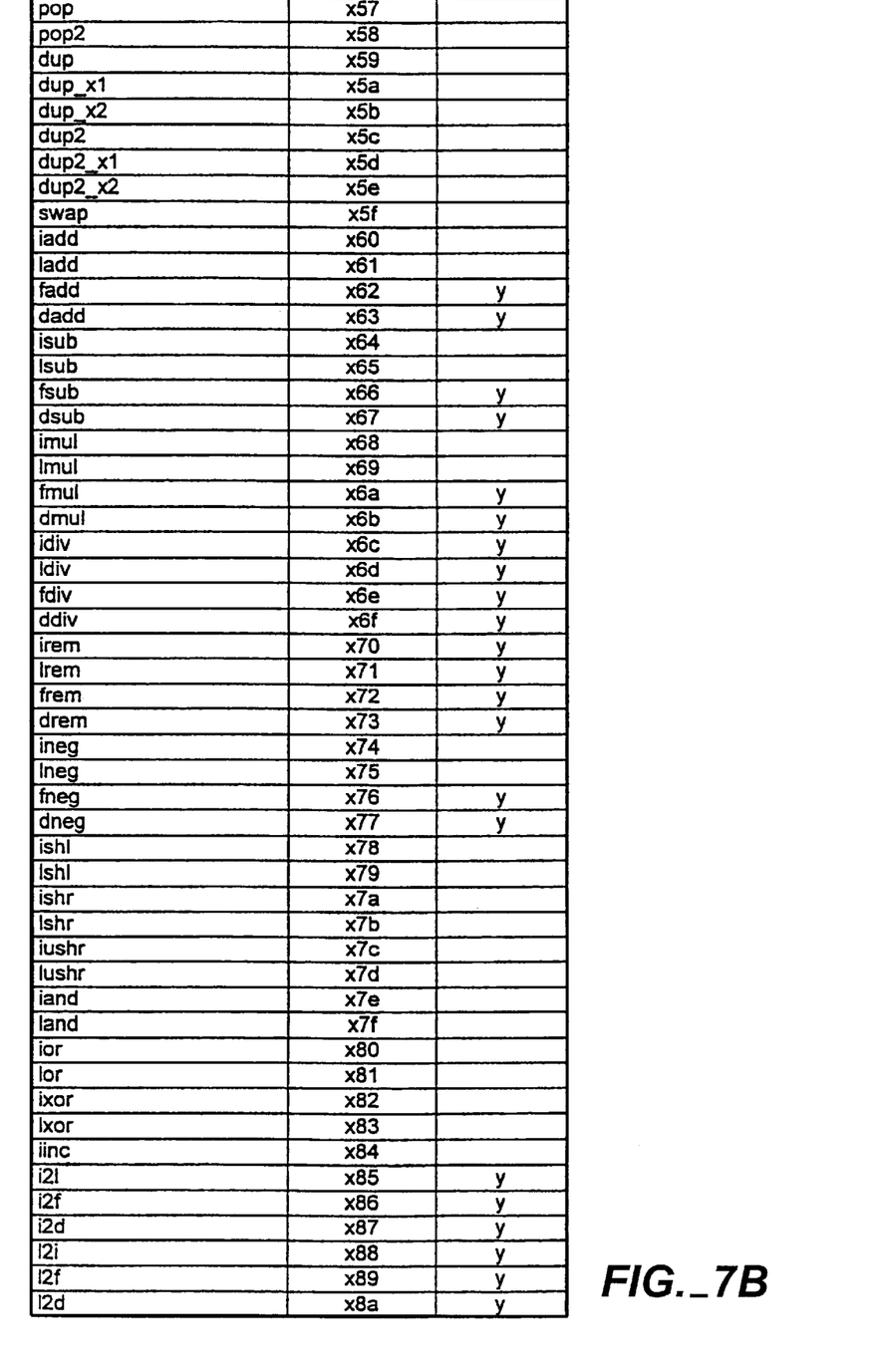
Figure 7C:
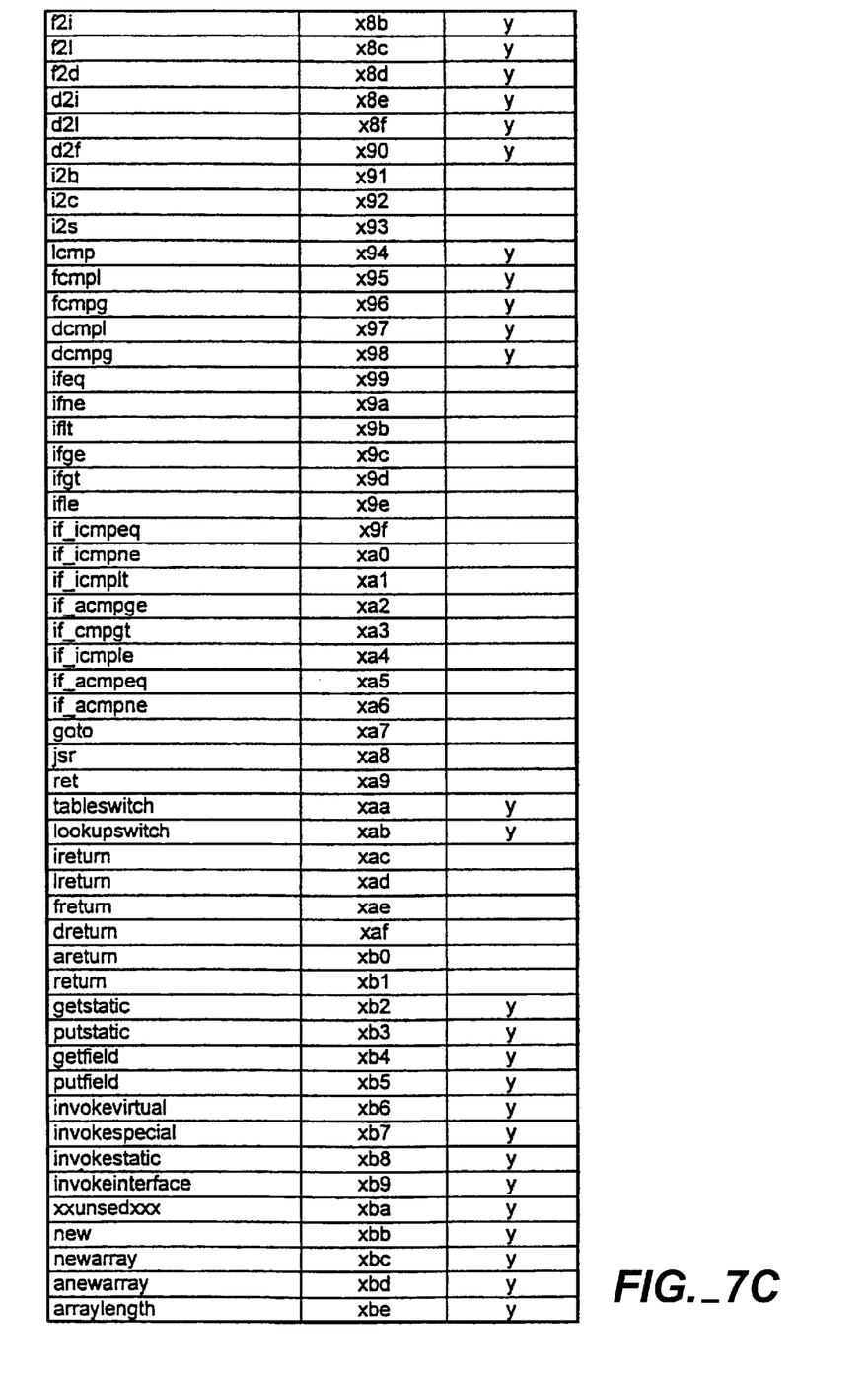
Figure 7D:
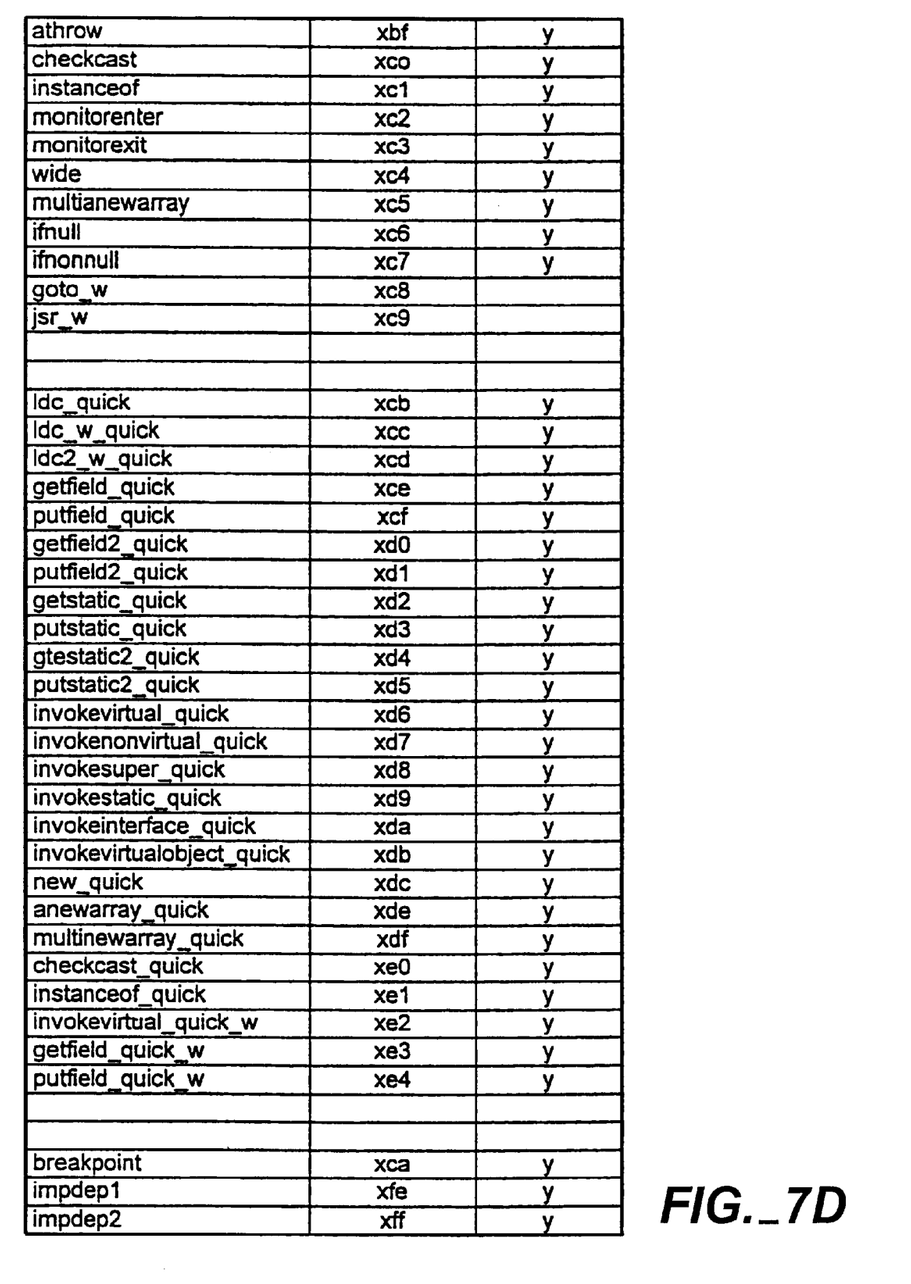

The operation of the Java hardware accelerator of one embodiment of the present invention is illustrated in FIGS. 5 and 6. FIG. 5, section I shows the instruction translation of the Java bytecode. The Java bytecode corresponding to the mnemonic iadd is interpreted by the Java virtual machine as an integer operation taking the top two values of the operand stack, adding them together and pushing the result on top of the operand stack. The Java translating machine translates the Java bytecode into a native instruction such as the instruction ADD R1, R2. This is an instruction native to the CPU indicating the adding of value in register R1 to the value in register R2 and the storing of this result in register R2. R1 and R2 are the top two entries in the operand stack.

As shown in FIG. 5, section II, the Java register includes a PC value of "Value A" that is incremented to "Value A+1". The Optop value changes from "Value B" to "Value B−1" to indicate that the top of the operand stack is at a new location. The Vars value which points to the top of the variable list is not modified. In FIG. 5, section III, the contents of a Java CPU register file, such as the Java CPU register file 48 in FIG. 3, is shown. The Java CPU register file starts off with registers R0–R5 containing operand stack values and registers R6–R7 containing variable values. Before the operation of the native instruction, register R1 contains the top value of the operand stack. Register R6 contains the first variable. After the execution of the native instruction, register R2 now contains the top value of the operand stack. Register R1 no longer contains a valid operand stack value and is available to be overwritten by a operand stack value from the memory sent across the overflow/underflow line 60 or from the bytecode stream.

FIG. 5, section IV shows the memory locations of the operand stack and variables which can be stored in the data cache 58 or in main memory. For convenience, the memory is illustrated without illustrating any virtual memory scheme. Before the native instruction executes, the address of the top of the operand stack, Optop, is "Value B". After the native instruction executes, the address of the top of the operand stack is "Value B−1" containing the result of the native instruction. Note that the operand stack value "4427" can be written into register R1 across the overflow/underflow line 60. Upon a switch back to the native mode, the data in the Java CPU register file 48 should be written to the data memory.

Consistency must be maintained between the Hardware Java Registers 44, the Java CPU register file 48 and the data memory. The CPU 26 and Java Accelerator Instruction Translation Unit 42 are pipelined and any changes to the hardware java registers 44 and changes to the control information for the Java CPU register file 48 must be able to be undone upon a "branch taken" signal. The system preferably uses buffers (not shown) to ensure this consistency. Additionally, the Java instruction translation must be done so as to avoid pipeline hazards in the instruction translation unit and CPU.

FIG. 6 is a diagram illustrating the operation of instruction level parallelism with the present invention. In FIG. 6 the Java bytecodes iload_n and iadd are converted by the Java bytecode translator to the single native instruction ADD R6, R1. In the Java Virtual Machine, iload_n pushes the top local variable indicated by the by the Java register VAR onto the operand stack.

In the present invention the Java hardware translator can combine the iload_n and iadd bytecode into a single native instruction. As shown in FIG. 6, section II, the Java Register, PC, is updated from "Value A" to "Value A+2". The Optop value remains "value B". The value Var remains at "value C".

As shown in FIG. 6, section III, after the native instruction ADD R6, R1 executes the value of the first local variable stored in register R6, "1221", is added to the value of the top of the operand stack contained in register R1 and the result stored in register R1. In FIG. 6, section IV, the Optop value does not change but the value in the top of the register contains the result of the ADD instruction, 1371.

The Java hardware accelerator of the present invention is particularly well suited to a embedded solution in which the hardware accelerator is positioned on the same chip as the existing CPU design. This allows the prior existing software base and development tools for legacy applications to be used. In addition, the architecture of the present embodiment is scalable to fit a variety of applications ranging from smart cards to desktop solutions. This scalability is implemented in the Java accelerator instruction translation unit of FIG. 4. For example, the lookup table 78 and state machine 74 can be modified for a variety of different CPU architectures. These CPU architectures include reduced instruction set computer (RISC) architectures as well as complex instruction set computer (CISC) architectures. The present invention can also be used with superscalar CPUs or very long instruction word (VLIW) computers.

While the present invention has been described with reference to the above embodiments, this description of the preferred embodiments and methods is not meant to be construed in a limiting sense. For example, the term Java in the specification or claims should be construed to cover successor programming languages or other programming languages using basic Java concepts (the use of generic instructions, such as bytecodes, to indicate the operation of a virtual machine). It should also be understood that all aspects of the present invention are not to be limited to the specific descriptions, or to configurations set forth herein. Some modifications in form and detail the various embodiments of the disclosed invention, as well as other variations in the present invention, will be apparent to a person skilled in the art upon reference to the present disclosure. It is therefore contemplated that the following claims will cover any such modifications or variations of the described embodiment as falling within the true spirit and scope of the present invention.

We claim:

1. A system comprising:
   a central processing unit having a register file, the central processing unit adapted to execute register-based instructions; and
   a hardware unit associated with the central processing unit, the hardware unit adapted to convert stack-based instructions into register-based instructions, wherein a portion of the operand stack is stored in the register file of the central processing unit and wherein the hardware unit is adapted to produce at least one of overflow or underflow indications for the portion of the operand stack stored in the register file, wherein the hardware unit is adapted to swap parts of the operand stack in and out of the register file from a memory, the system including an indication of the depth of the portion of operand stack, wherein a overflow or underflow produces an operand transfer between the register file in the central processing unit and memory.

2. The system of claim 1, wherein the central processing unit includes the hardware unit.

3. The system of claim 1, wherein the hardware unit is outside of the central processing unit.

4. The system of claim 1, wherein the system includes an indication of the depth of the portion of operand stack stored in the register file.

5. The system of claim 1, wherein, the stack based instructions are Java bytecodes.

6. The system of claim 1, wherein the registers of the register file of the central processing unit used to store the portion of operand stack is full of valid data.

7. The system of claim 6, wherein the at least one of the overflow or underflow indications is generated by a stack instruction pushing an operand or popping the operand from the operand stack.

8. The system of claim 1, wherein the hardware unit has access to the date bus of the central processing unit.

9. The system of claim 1, wherein the hardware unit is further adapted to store at least some Java variables in the register file.

10. The system of claim 1, wherein the hardware unit is further adapted to store at least some Java registers in the register file.

11. The system of claim 1, wherein the stack-based instructions are associated with a virtual machine.

12. The system of claim 1, wherein the stack-based instructions are Java bytecode.

13. The system of claim 1, wherein the hardware unit implements at least part of a Java virtual machine.

14. The system of claim 1, wherein the hardware unit is connected between a memory and the central processing unit.

15. The system of claim 14, wherein the hardware unit is connected between an instruction cache and the central processing unit.

16. The system of claim 1, wherein the hardware unit is adapted to manage a Java stack.

17. The system of claim 1, wherein the hardware unit has access to at least one bus of the central processing unit.

18. The system of claim 1, wherein the hardware unit is adapted to examine the stack-based instructions to determine whether multiple stack-based instructions can be combined into fewer register-based instructions.

19. The system of claim 18, wherein the hardware unit produces register-based instructions that access the portion of the operand stack in the register file so as to reduce the number of register-based instructions that would otherwise be required.

20. The system of claim 18, wherein multiple stack-based instructions pass through the hardware unit concurrently to allow for the operation of the combining logic.

21. The system of claim 1, wherein the hardware unit is adapted to convert multiple Java bytecodes into a single register-based instruction.

22. The system of claim 21, wherein the multiple Java bytecodes include a basic operand instruction and one or more stack manipulation instructions.

23. The system of claim 21, wherein the multiple Java bytecodes includes a load or store instruction.

24. The system of claim 1, wherein the central processing unit and hardware unit are on the same chip.

25. The system of claim 1, wherein the hardware unit produces an exception upon at least one of the stack-based instructions, and wherein the central processing unit will, in software, translate the at least one of the stack-based instructions causing the exception.

26. The system of claim 1, wherein the hardware unit includes logic to keep a count of how many entries have been placed on the operand stack.

27. The system of claim 1, wherein the hardware unit includes logic that keeps track of portions of the Java operand stack stored in the register file and when a Java bytecode to be translated references an element of the Java operand stack stored in a register of the register file, the hardware unit produces an indication of that register to be used in the translation process.

28. The system of claim 1, wherein the hardware unit keeps track of a top of stack register location, wherein the top of stack register in the register file is not fixed and can change as a result of an executed instruction.

29. The system of claim 1, wherein the hardware subunit keeps track of which registers in the register file contain portions of the Java operand stack, the meaning of the registers being able to change as a result of an executed instruction.

30. The system of claim 2, wherein the central processing unit includes an execution unit to execute the register-based instructions.

31. The system of claim 1, wherein the translated register-based instructions are produced internally within the central processing unit.

32. The system of claim 1, wherein register-based instructions cause the manipulation of the register file.

33. A system comprising:
a central processing unit having a register file, the central processing unit adapted to execute register-based instructions; and
a hardware unit associated with the central processing unit, the hardware unit adapted to convert Java bytecode instructions into register-based instructions, wherein the hardware unit is adapted to store at least one Java variable in the central processing unit's register file at a location separate from any operand stack, wherein at least one of the register-based instructions reference a register in the central processing unit's register file containing one of the at least one Java variable, wherein a portion of the operand stack is stored in the register file of the central processing unit and wherein the hardware unit is adapted to produce at least one of overflow or underflow indications for the portion of the operand stack stored in the register file.

34. The system of claim 33, wherein the central processing unit includes the hardware unit.

35. The system of claim 33, wherein the hardware unit is outside of the central processing unit.

36. A system comprising:
a central processing unit having a register file, the central processing unit adapted to execute register-based instructions; and
a hardware unit associated with the central processing unit, the hardware unit adapted to convert Java bytecode instructions into register-based instructions, wherein the hardware unit is adapted to store at least one Java register in the central processing unit's register file, wherein at least one of the register-based instructions reference a register in the central processing unit's register file containing one of the at least one Java register, the at least one Java register including the Java program counter wherein a portion of the operand stack is stored in the register file of the central processing unit and wherein the hardware unit is adapted to produce at least one of overflow or underflow indications for the portion of the operand stack stored in the register file.

37. The system of claim 36, wherein the central processing unit includes the hardware unit.

38. The system of claim 36, wherein the hardware unit is outside of the central processing unit.

39. A central processing unit comprising:
an input adapted to receive stack-based instructions;
a register file adapted to be manipulated using register-based instructions, the register file adapted to store a portion of an operand stack; and
a hardware subunit adapted to convert stack-based instructions into register-based instructions, wherein the hardware subunit is adapted to produce at least one of overflow or underflow indications for the portion of the operand stack stored in the register file, wherein the hardware subunit is adapted to swap parts of the operand stack in and out of the register file from a memory, the system including an indication of the depth of the portion of operand stack, wherein a overflow or underflow produces an operand transfer between the register file and memory.

40. The Central Processing Unit of claim 39, wherein, the stack-based instructions are Java bytecodes.

41. The central processing unit of claim 39, wherein the hardware subunit is adapted to swap parts of the operand stack in and out of the register file from a memory.

42. The central processing unit of claim 39, wherein the hardware subunit is further adapted to store at least some Java variables in the register file.

43. The central processing unit of claim 39, wherein the hardware subunit is further adapted to store at least some Java registers in the register file.

44. The central processing unit of claim 39, wherein the central processing unit includes an indication of the depth of the portion of operand stack stored in the register file.

45. The central processing unit of claim 39 wherein the indication of the operand stack depth is stored in the hardware subunit.

46. The central processing unit of claim 39 wherein a overflow or underflow produces operand transfer between the register file in the central processing unit and memory.

47. The central processing unit of claim 39 wherein, the stack-based instructions are Java bytecodes.

48. The central processing unit of claim 37, wherein the registers of the register file of the central processing unit used to store the portion of operand stack is full of valid data.

49. The central processing unit of claim 37, wherein the at least one of the overflow or underflow indications is generated by a stack instruction pushing an operand or popping the operand from the operand stack.

50. The central processing unit of claim 37, wherein the stack-based instructions are associated with a virtual machine.

51. The central processing unit of claim 50, wherein the stack-based instructions are associated with a Java virtual machine.

52. The central processing unit of claim 37, wherein the stack-based instructions are Java bytecodes.

53. The central processing unit of claim 37, wherein the hardware subunit implements at least part of a Java virtual machine.

54. The central processing unit of claim 37, wherein the hardware subunit is adapted to manage a Java stack.

55. The central processing unit of claim 37, wherein the hardware subunit has access to at least one bus of the central processing unit.

56. The central processing unit of claim 39, wherein the hardware subunit is adapted to examine the stack-based instructions to determine whether multiple stack-based instructions can be combined into fewer register-based instructions.

57. The central processing unit of claim 56, wherein the hardware subunit produces register-based instructions that access the portion of the operand stack in the register file so as to reduce the number of register-based instructions that would otherwise be required.

58. The central processing unit of claim 56, wherein multiple stack-based instructions pass through the hardware subunit concurrently to allow for the operation of the combining logic.

59. The central processing unit of claim 39, wherein the hardware subunit is adapted to convert multiple Java bytecodes into a single register-based instruction.

60. The central processing unit of claim 59, wherein the multiple Java bytecodes include a basic operand instruction and one or more stack manipulation instructions.

61. The central processing unit of claim 59, wherein the multiple Java bytecodes includes a load or store instruction.

62. The central processing unit of claim 39, wherein the hardware subunit produces an exception upon at least one of the stack-based instructions, and wherein the central processing unit will, in software, translate the at least one of the stack-based instructions causing the exception.

63. The system of claim 39, wherein the hardware subunit includes logic to keep a count of how many entries have been placed on the operand stack.

64. The system of claim 39, wherein the hardware subunit includes logic that keeps track of Java variables stored in the register file and when a Java bytecode to be translated references a Java variable stored in a register of the register file, the hardware subunit produces an indication of that register to be used in the translation process.

65. The system of claim 39, wherein the hardware subunit includes logic that keeps track of portions of the Java operand stack stored in the register file and when a Java bytecode to be translated references an element of the Java operand stack stored in a register of the register file, the hardware unit produces an indication of that register to be used in the translation process.

66. The system of claim 39, wherein the hardware subunit keeps track of which registers in the register file contain portions of the Java operand stack, the meaning of the registers being able to change as a result of an executed instruction.

67. The system of claim 39, wherein the central processing unit includes an execution unit to execute the register-based instructions.

68. The system of claim 39, wherein the translated register-based instructions are produced internally within the central processing unit.

69. A central processing unit comprising:

an input adapted to receive Java bytecode instructions;

a register file adapted to be manipulated using register-based instructions, the register file adapted to store a portion of an operand stack; and a hardware subunit adapted to convert Java instructions into register-based instructions, wherein the hardware subunit is adapted to store at least one Java variable in the register file at a location separate from any operand stack, wherein at least one of the register-based instructions reference a register in the central processing unit's register file containing one of the at least one Java variable, wherein the hardware subunit is adapted to produce at least one of overflow or underflow indications for the portion of the operand stack stored in the register file.

70. A central processing unit comprising:

an input adapted to receive Java bytecode instructions;

a register file adapted to be manipulated using register-based instructions, the register file adapted to store a portion of an operand stack; and a hardware subunit adapted to convert Java instructions into register-based instructions, wherein the hardware subunit is adapted to store at least one Java register in the register file, wherein at least one of the register-based instructions reference a register in the central processing unit's register file containing one of the at least one Java register, the at least one Java Register including the Java Program Counter, wherein the hardware subunit is adapted to produce at least one of overflow or underflow indications for the portion of the operand stack stored in the register file.

\* \* \* \* \*

UNITED STATES PATENT AND TRADEMARK OFFICE
CERTIFICATE OF CORRECTION

PATENT NO. : 6,332,215 B1  Page 1 of 1
DATED : December 18, 2001
INVENTOR(S) : Mukesh, K. Patel, Jay Kamdar and V.R. Ranganath It is certified that error appears in the above-identified patent and that said Letters Patent is hereby corrected as shown below:

Drawings,
Figure 3, the reference numeral "25" denoting the CPU should be -- 26 --;

Column 1,
Line 54, "local-cost" should be -- low-cost --;

Column 3,
Line 5, "26" denoting the multiplexer should be -- 28 --;

Column 7,
Line 59, "date" should be -- data --;

Column 10,
Line 18, "37" should be -- 39 --;
Line 21, "37" should be -- 39 --;
Line 25, "37" should be -- 39 --;
Line 31, "37" should be -- 39 --;
Line 33, "37" should be -- 39 --;
Line 36, "37" should be -- 39 --;
Line 38, "37" should be -- 39 --;

Signed and Sealed this

Ninth Day of July, 2002

Attest:

Attesting Officer

JAMES E. ROGAN
Director of the United States Patent and Trademark Office